(12) United States Patent
Wright et al.

(10) Patent No.: US 8,380,389 B2
(45) Date of Patent: Feb. 19, 2013

(54) HEALTH MONITORING SYSTEMS AND METHODS WITH VEHICLE IDENTIFICATION

(75) Inventors: George Wright, Corrales, NM (US); Mark Allen Wright, Albuquerque, NM (US); Grant Gordon, Peoria, AZ (US); Mark Simons, Bosque Farms, NM (US)

(73) Assignee: Honeywell International Inc., Morristown, NJ (US)

( * ) Notice: Subject to any disclaimer, the term of this patent is extended or adjusted under 35 U.S.C. 154(b) by 383 days.

(21) Appl. No.: 12/627,818

(22) Filed: Nov. 30, 2009

(65) Prior Publication Data

US 2011/0130915 A1  Jun. 2, 2011

(51) Int. Cl.
*G01M 17/00* (2006.01)
(52) U.S. Cl. .......................... 701/29.6; 342/42
(58) Field of Classification Search .............. 701/32, 701/29, 30, 35, 14, 101, 102; 342/42, 44, 342/50, 51; 123/406.2, 406.26
See application file for complete search history.

(56) References Cited

U.S. PATENT DOCUMENTS

| | | | |
|---|---|---|---|
| 4,635,058 A | 1/1987 | Sutphin, Jr. | |
| 5,075,680 A | 12/1991 | Dabbs | |
| 5,334,982 A | 8/1994 | Owen | |
| 6,204,778 B1 | 3/2001 | Bergan et al. | |
| 6,388,579 B1 | 5/2002 | Adcox et al. | |
| 6,448,891 B2 | 9/2002 | Barnett | |
| 6,822,582 B2 | 11/2004 | Voeller et al. | |
| 7,034,716 B2 | 4/2006 | Succi et al. | |
| 7,061,371 B2 | 6/2006 | Shockley | |
| 7,071,841 B2 | 7/2006 | Haynes et al. | |
| 7,356,394 B2 | 4/2008 | Burgess | |
| 2004/0088087 A1 | 5/2004 | Fukushima et al. | |
| 2004/0189511 A1* | 9/2004 | Gila et al. | 342/42 |
| 2004/0222917 A1* | 11/2004 | Butler | 342/45 |
| 2005/0068199 A1 | 3/2005 | Succi et al. | |
| 2006/0241916 A1 | 10/2006 | Sieracki | |
| 2008/0120124 A1 | 5/2008 | Zoeckler et al. | |
| 2008/0129548 A1 | 6/2008 | Firestone | |
| 2009/0115635 A1 | 5/2009 | Berger et al. | |
| 2010/0204876 A1* | 8/2010 | Comeau et al. | 701/32 |
| 2011/0257900 A1* | 10/2011 | Adams et al. | 702/33 |

OTHER PUBLICATIONS

Wright et al.; Image Search Enhanced Vehicle Telemaintenance, Filed with the United States Patent Office on Jan. 15, 2009 and assigned U.S. Appl. No. 12/354,311.
Wright et al.; Filed with the United States Patent Office on Jan. 30, 2008 and assigned U.S. Appl. No. 12/022,859.
Saugen et al.; Filed with the United States Patent Office on Oct. 30, 2007 and assigned U.S. Appl. No. 11/928,911.
Dipetta et al.; Enhancing HMMWV Operational Availability through the Use of an Instrumented Diagnostic Cleat for Condition-Based Maintenance, pp. 383-391; Proceedings of the 7th Instructional Workshop on Structural Health Monitoring; Sep. 9-11, 2009.

(Continued)

*Primary Examiner* — Thomas Black
*Assistant Examiner* — Luke Huynh
(74) *Attorney, Agent, or Firm* — Ingrassia Fisher & Lorenz, P.C.

(57) ABSTRACT

A health monitoring system is provided for a vehicle with an identity configured to travel on a surface. The system includes a body positioned on the surface and configured to stimulate a dynamic response from the vehicle as the vehicle travels over the body; a response sensor associated with the body and configured to measure the dynamic response from the vehicle; and an identification sensor associated with the body and configured to collect data corresponding to the identity of the vehicle.

16 Claims, 12 Drawing Sheets

OTHER PUBLICATIONS

Nixon et al.; Acoustic Information Fusion for Ground Vehicle Classification; The 11th International Conference of Information Fusion, 2008.

Munich M. E.; Bayesian Subspace Methods for Acoustic Signature Recognition of Vehicles, pp. 2107-2110; Proceedings of the 12th European Signal Processing Conference (EUSIPCO 2004).

Lu, B.: Perimeter Security on Detecting Acoustic Signature of Approaching Vehicle Using Nonlinear Neural Computation, pp. 51-56; 2008 IEEE Conference on Technologies for Homeland Security.

* cited by examiner

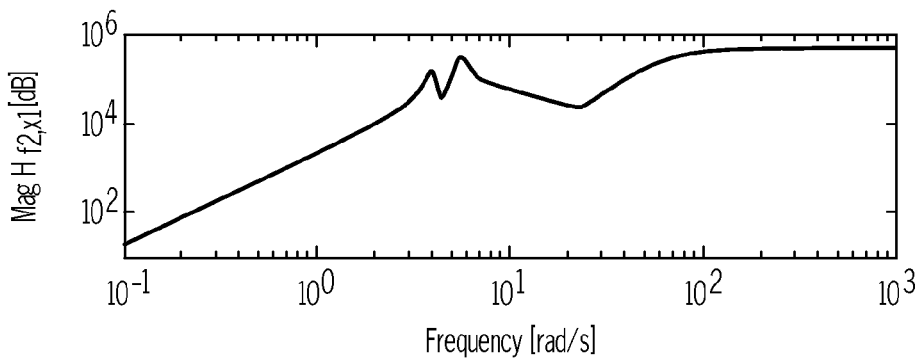
FIG. 6A(1)
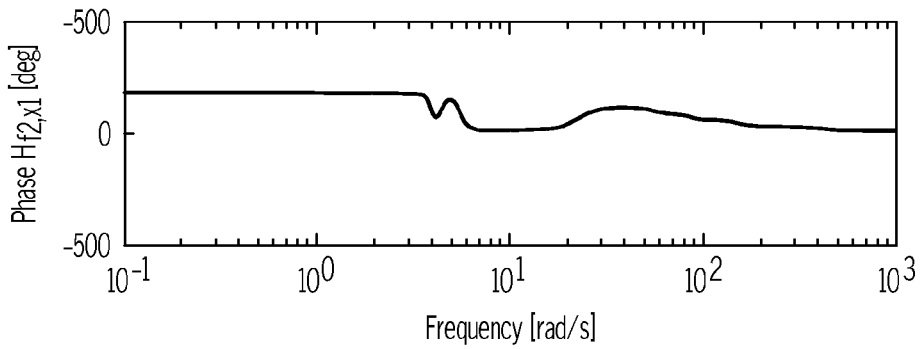
FIG. 6A(2)
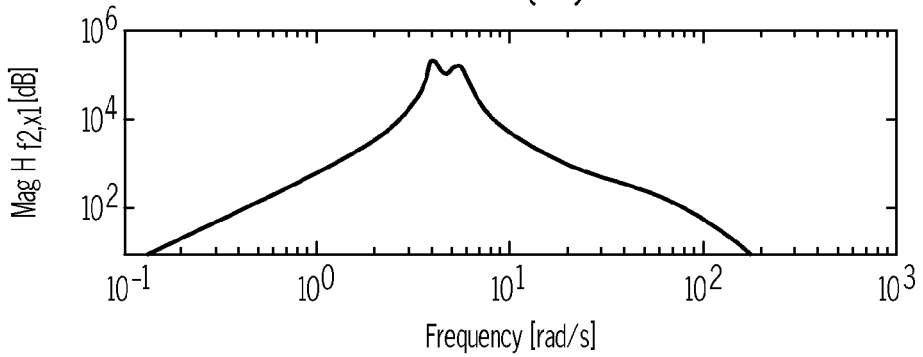
FIG. 6A(3)
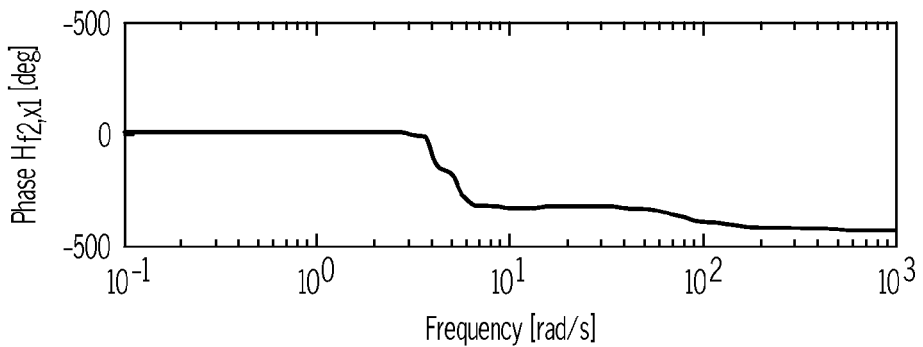
FIG. 6A(4)

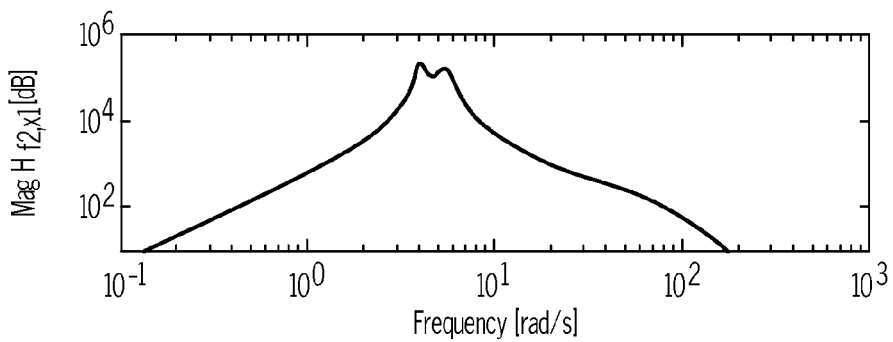
FIG. 6B(1)
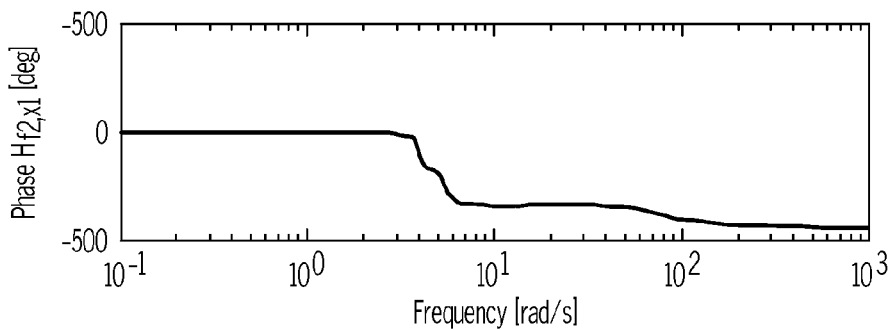
FIG. 6B(2)
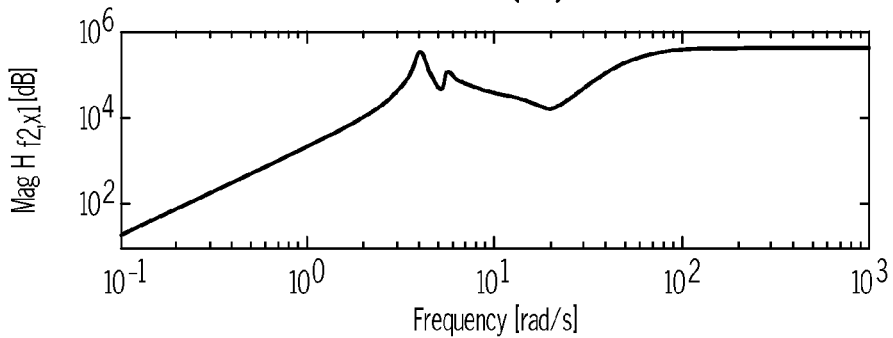
FIG. 6B(3)
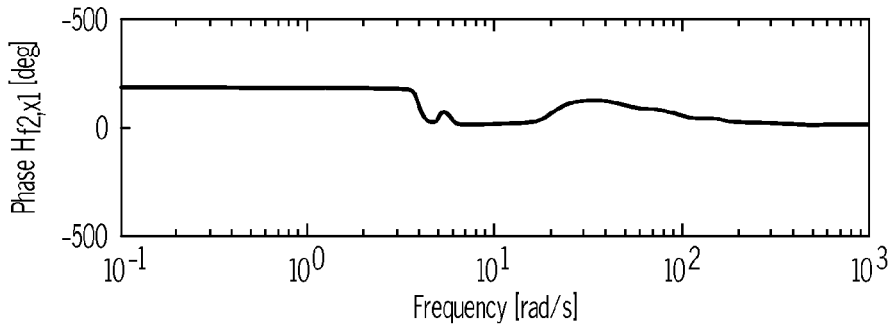
FIG. 6B(4)

HEALTH MONITORING SYSTEMS AND METHODS WITH VEHICLE IDENTIFICATION

TECHNICAL FIELD

The present invention generally relates to vehicle health monitoring systems, and more particularly relates to health monitoring systems and methods with vehicle identification.

BACKGROUND

Military, such as the U.S. Army, commercial, industrial, and consumer operators are each pursuing technologies that will enable Condition-Based Maintenance (CBM) of ground vehicles. Conventional maintenance schedules for ground vehicles are determined based on reliability predictions of a population of vehicles under anticipated operational loads. Most common vehicle faults occur in the tires, brakes, suspensions, body chassis, and frames. However, despite prediction models, component damage for such vehicles often lies in the tails of the reliability distribution curve. For example, a certain group of vehicles may be deployed to operate on a harsh terrain that is particularly taxing on the mechanical components of those vehicles. The reliability predictions for these vehicles may not accurately predict component issues. Not surprisingly, operation and support costs for military vehicles account for a large portion of budget cost.

To ensure readiness and decrease these costs for ground vehicle fleets, health monitoring technologies are being developed to assess the reliability of the fleet. Some fleets have health monitoring systems installed within each vehicle to enhance the reliability predictions. However, individual health monitoring systems for each vehicle may be expensive.

Some conventional health monitoring systems evaluate the health of the vehicle based on the dynamic responses of the vehicle as it traverses over terrain. One way of detecting faults in mechanical components is to detect anomalies in comparisons between measured vibrations and healthy reference signatures. In order to make this comparison, a library of vibration signatures must be developed and categorized according to the operational conditions of the vehicle.

There are a number of difficulties with these conventional approaches. The operational responses of the vehicles are difficult to model due to the non-stationary nature of the loading and the inability to control these loads during operation. Second, many vehicles are not equipped with sensors nor the acquisition systems to acquire, process, and store data; therefore, to implement health monitoring for condition-based maintenance, one needs to overcome the economic and technical barriers associated with equipping ground vehicles to continuously monitor their responses. Another difficulty of these health monitoring systems is the limited usefulness of the dynamic response data gathered from the vehicles.

Accordingly, it is desirable to provide health monitoring systems and methods that can be more reliable, require less equipment installed on the vehicles, provide more useful data, and enable modeling of the vehicle's remaining useful life (RUL). Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a health monitoring system is provided for a vehicle with an identity configured to travel on a surface. The system includes a body positioned on the surface and configured to stimulate a dynamic response from the vehicle as the vehicle travels over the body; a response sensor associated with the body and configured to measure the dynamic response from the vehicle; and an identification sensor associated with the body and configured to collect data corresponding to the identity of the vehicle.

In accordance with another exemplary embodiment, a method is provided for monitoring the health of and determining the identity of a vehicle configured to travel on a surface. The method includes stimulating a dynamic response of the vehicle by positioning a cleat on the surface such that the vehicle rolls over the cleat as the vehicle travels on the surface; measuring the dynamic response of the vehicle to the cleat; evaluating the health of the vehicle based on the dynamic response; collecting identification information from the vehicle; and determining the identity of the vehicle from the collected identification information.

BRIEF DESCRIPTION OF THE DRAWINGS

The present invention will hereinafter be described in conjunction with the following drawing figures, wherein like numerals denote like elements, and wherein:

FIG. 6A is a graphical representation of Bode diagrams (magnitude and phase) for the sample output/input frequency response functions F1/X1 and F2/X1 in an exemplary system of FIG. 2;

FIG. 6B is a graphical representation of Bode diagrams (magnitude and phase) for the other sample output/input frequency response functions F1/X2 and F2/X2 in an exemplary system of FIG. 2;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to vehicle monitoring systems and methods. The vehicle monitoring systems and methods include an instrumented cleat placed within the path of a vehicle to be monitored. As the vehicle passes over the cleat, sensors within the cleat measure characteristics of the vehicle, including the vehicle's dynamic response to the stimulus of the cleat. The health monitoring system and method can diagnose faults within the vehicle based on these measured characteristics. The health monitoring systems and methods may additionally include an identification sensor that identifies the individual vehicle. Identification and health monitoring of the vehicle enables historical health trending, evaluation of the remaining useful life and mission suitability, and enhanced fleet and convoy management.

Figure 1:
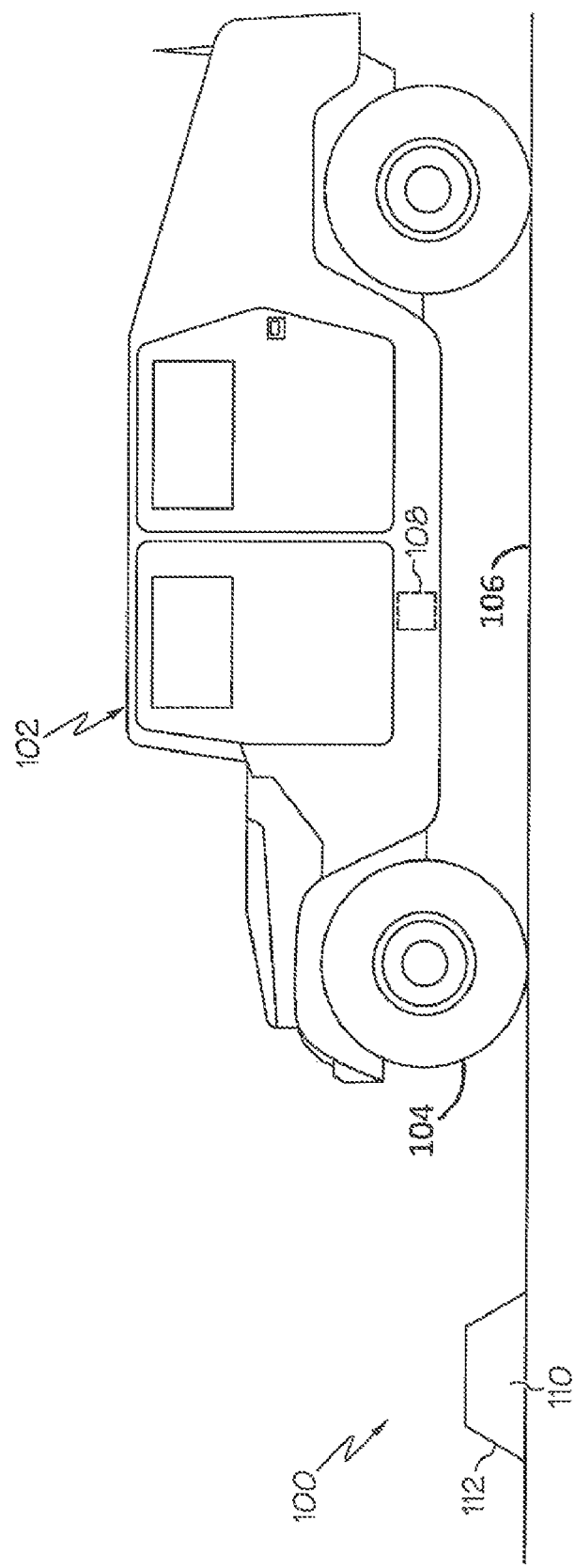
FIG. 1 is a schematic representation of a vehicle health monitoring system in accordance with an exemplary embodiment.

FIG. 1 is a schematic representation of a vehicle health monitoring system 100 during use in accordance with an exemplary embodiment. As discussed in greater detail below, the system 100 is configured to identify a vehicle 102 on a roadway 106 and diagnose faults within the vehicle 102.

The vehicle 102 can be any type of vehicle, such as military, commercial or any other type of vehicles. The system 100 may be used with any number of vehicles 102, including similar or dissimilar vehicles. In general, the vehicle 102 has one or more wheels 104. As used herein, the term "wheel" refers to the rotating device that supports the vehicle on the roadway 106. For example, if the vehicle 102 is an automobile, the wheel 104 is a tire. However, various embodiments are not so limited, and include those vehicles having metallic wheels in contact with the roadway 106, including trains in which the roadway 106 is a train track, industrial vehicles such as Bobcats® (in which substantially solid rubber tires are mounted on metallic wheels, and in which the roadway 106 is an aisle within a factory), tanks or other track vehicles, and airplanes (in which a pneumatic tire is in contact with a roadway 106 that is a runway). As such, the term "roadway" may be any surface over which the vehicle 102 is being driven, including a road, terrain, runway, factory floor, or other vehicle path. As will be discussed in greater detail below, the vehicle 102 may further include an identifier 108 from which the system 100 may identify the individual vehicle 102. For example, the identifier 108 may be associated with a vehicle identification number (VIN).

The system 100 includes a cleat 110 placed on the roadway 106. FIG. 1 illustrates the vehicle 102 preparing to drive over the cleat 110. The cleat 110 has an external body 112 similar in structure to a speed bump in that the vehicle 102 rolls over the cleat 110. As discussed in greater detail below, the external body 112 of the cleat 110 functions as a stimulus and the vehicle's response to this stimulus may be evaluated by the system 100. For example, the cleat 110 may force a measurable oscillation of the vehicle 102 that is evaluated.

In one exemplary embodiment, one or more generally unattended cleats 110 may be placed on the roadway 106 to collect data associated with a single vehicle 110 or a fleet of similar or dissimilar vehicles 102. In effect, the cleat 110 provides a known, predetermined terrain stimulus for evaluating the vehicle 102, which would otherwise not be available for on-board vehicle health monitoring systems. In further embodiments, the system 100 may include a number of cleats 110 and the measured responses to each cleat 110 may form part of a single evaluation of the vehicle 102 by the system 100.

The external body 112 of the cleat 110 may have any suitable length, width, height, and cross-sectional configuration. For example, the external body 112 of the cleat 110 may have a width such that one or more of the wheels 104 of the vehicle 102 roll over the cleat 110. In one exemplary embodiment, the external body 112 has a width sufficient for both front wheels 104 of the vehicle 102 to roll over the cleat 110 at approximately the same time. Similarly, the external body 112 has a height sufficient to cause the desired response from the vehicle 102. Moreover, the external body 112 may have a height to encourage certain driver behavior, i.e., to encourage the driver of the vehicle 102 to speed up or slow down as the vehicle 102 travels over the cleat 110 since velocity may impact the gathered data. Finally, the external body 112 has a length sufficient to collect the necessary response from the vehicle 102. For example, the response of the vehicle 102 may have a certain duration, and as such, the external body 112 of the cleat 110 may be long enough such that the vehicle 102 is positioned over the cleat 110 during the duration of the response. In general, some embodiments of the cleat 110 may be fabricated from an elastomeric material that is molded into a desired shape. The material and mechanical configurations are chosen to achieve the desired response from the vehicle 102. Accordingly, in general, the external body 112 of the cleat 110 can be engineered to control the amplitude and frequency of the input imparted to the vehicle wheels 104 to thus enable more targeted diagnostic results; test particular subsystems; and appropriately position sensors within the cleat 110 to collect desired data.

As discussed above, a number of cleats 110 can be arranged in a particular configuration to collect desired data. For example, a pair of cleats 110 may be located at the entrance and exit of a turn in the roadway 106 to evaluate the response of the vehicle 102 through the turn. In other embodiments, multiple patterns of cleats 110 may be adapted and configured to excite one or more of the resonant frequencies of a particular vehicle system. In other embodiments, a pattern of cleats 110 may be spaced apart so as to excite a particular pitching, rolling, vibrating, or oscillation mode in the vehicle 102. Various types of cleats 110 may be arranged into a pattern of cleats 110.

The cleat 110 illustrated by FIG. 1 has a cross-sectional shape of a truncated pyramid and is located on the top surface of the roadway 106. The underside of cleat 110 may be flat and generally adapted to conform to the surface of the roadway 106. However, the underside of the cleat 110 can also be configured to detachably couple to the roadway 106. Such configurations of the cleat 110 may be useful in those applications in which the cleat 110 is considered not only portable, but also fixed other than by friction to the roadway 106. In further embodiments, the cleats 110 may also be permanently fixed to the roadway 106.

Other geometric configurations of the external body 112 of the cleat 110 may be provided. For example, as opposed to the truncated pyramid configuration shown in FIG. 1, the cleat 110 may be chevron-shaped. In other embodiments, the cleat 110 may not be symmetric about a vertical axis and may include angled sections greater or less than that shown in FIG. 1. Further embodiments of the cleat 110 may be configured as a semi-circular or curved bump in the roadway 106. In further embodiments, the cleat 110 may be adapted and configured to provide relatively little or no elevation change to the tire of the vehicle. In such embodiments, the wheel 104 of the vehicle 102 change elevation when traversing cleat 110 based primarily on the compressive characteristics of the cleat material. Further, yet other embodiments of the cleat 110 may rest within a trough of the roadway 106, but with a top transitional surface that is at an elevation above, below, or coincident the surface of the roadway 106. It is understood that various embodiments can utilize many different configurations of cleats 110.

Figure 2:
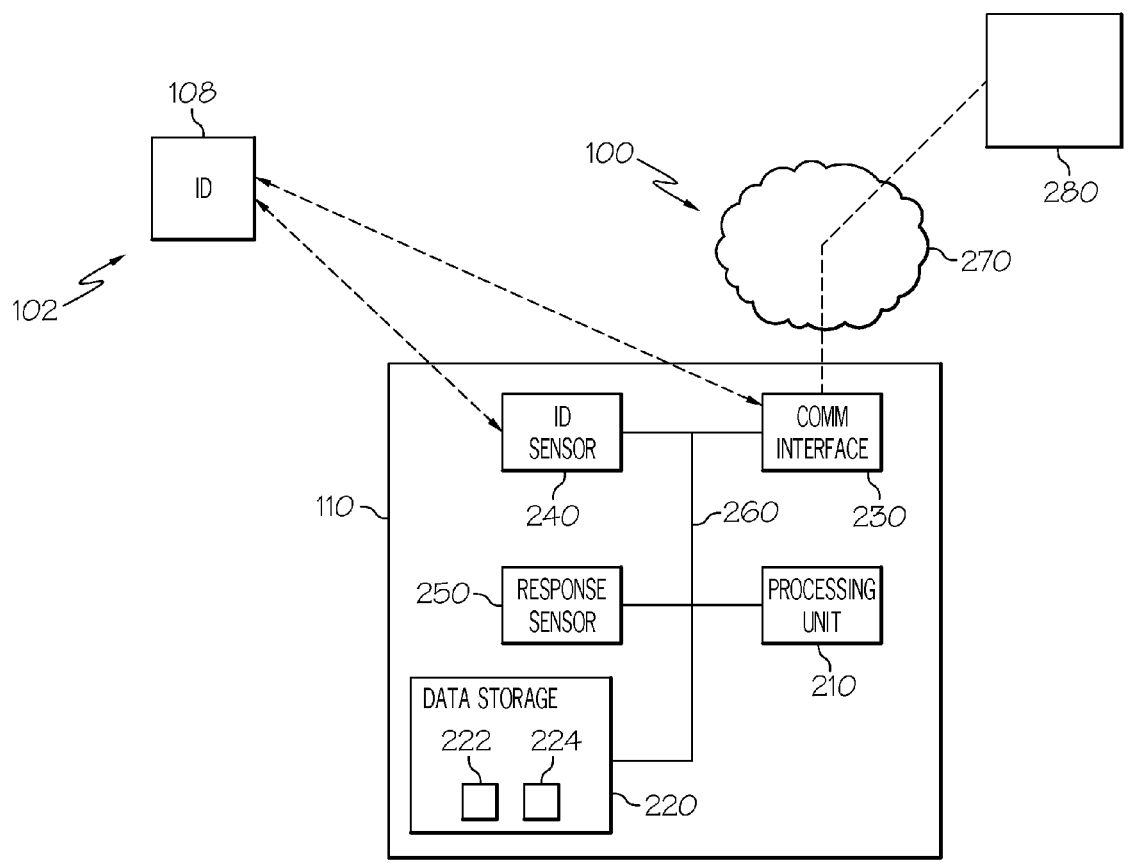
FIG. 2 is a block diagram of the vehicle health monitoring system in accordance with an exemplary embodiment.

FIG. 2 is a block diagram of the health monitoring system 100 in accordance with an exemplary embodiment. The system 100 includes one or more cleats 110. Each cleat 110 typically includes a processing unit 210, data storage 220, a communication interface 230, an identification sensor 240, and a response sensor 250 coupled together with a bus 260. The system 100 may further include a control entity 280 that communicates with the cleat 110 via a network 270. In general, as discussed below, the cleats 110 function to gather health and identification data from the vehicle 102 passing over the respective cleat 110. The control entity 280 gathers the data from the cleats 110 for further evaluation, aggregation, and uses, as also discussed in greater detail below.

The processing unit 210 may include one or more central processing units, computer processors, mobile processors, digital signal processors (DSPs), application-specific integrated circuits (ASICs), graphics processing units (GPUs), microprocessors, computer chips, integrated circuits, and similar processing units and may execute machine-language instructions and process data stored in data storage 220 or provided via other system components.

Data storage 220 may include one or more storage devices, such as read-only memory (ROM), random access memory (RAM), removable-disk-drive memory, hard-disk memory, magnetic-tape memory, flash memory, and other suitable storage devices. Data storage 220 includes at least enough storage capacity to contain machine-language instructions 222 and data structures 224. The machine-language instructions 222 and the data structures 224 contained in data storage 220 include instructions executable by the processing unit 210 and any storage required, respectively, to perform some or all of the herein-described functions of the system 100. Particularly, the machine language instructions 222 and data structures 224 may include databases containing dynamic response data, health models and algorithms for evaluating the dynamic responses of the vehicle 102, and identification databases for evaluating the identification information from the vehicle 102. Data may additionally be stored in external data sources accessible via the network 270.

The communication interface 230 may be any suitable communications interface for sending and receiving data over a wired-communication interface and/or a wireless-communication interface. A wired-communication interface, if present, may include a wire, cable, fiber-optic link or similar physical connection to a data network, such as a wide area network (WAN), a local area network (LAN), one or more public data networks, such as the Internet, one or more private data networks, or any combination of such networks. A wireless-communication interface, if present, may utilize an air interface, such as a ZigBee, Wi-Fi, and/or WiMAX interface to a data network, such as a WAN, a LAN, one or more public data networks (e.g., the Internet), one or more private data networks, or any combination of public and private data networks. The communication interface 230 may enable secure communications with communication-security techniques such as, for example, Secure Sockets Layer (SSL), Transport Layer Security (TLS), Secure Shell (SSH), Virtual Private Network (VPN), IP Security (IPSec), Trusted Computer System Evaluation Criteria (TCSEC)/Orange Book techniques, ISO/IEC 15443, 15408 and/or 17799 techniques, public/private key techniques such as the RSA algorithm, and/or other cryptographic algorithms. Although certain embodiments discussed herein refer to the components of the system 100 being housed within the cleat 110, the communication interface 230 enables one or more of the components to be outside of the cleat 110, including in the vicinity around the cleat 110, part of larger network or system outside of the physical area of the cleat 110, or distributed over a number of cleats 110.

The identification sensor 240 of the cleat 110 functions to identify the vehicle 102 as it drives over the cleat 110 or when the vehicle 102 is in the general vicinity of the cleat 110. Typically, the identification sensor 240 is positioned within the cleat 110, although in other embodiments, the identification sensor 240 is outside of the cleat 110. In general, the identity of the vehicle 102 is unique to the individual vehicle 102. For example, the vehicle may be identified by a vehicle identification number (VIN). As used herein, the unique identifier for the vehicle 102 will be referred to as the "VIN," although it will be appreciated that any vehicle identifier may be used.

The identification sensor 240 may identify the vehicle 102 in any suitable manner. In one exemplary embodiment, the identification sensor 240 receives information associated with the VIN based on the identifier 108 associated with each vehicle 102. The processing unit 210 then executes suitable machine-language instructions 222 and data structures 224 stored in data storage 220 to determine the VIN based on the information gathered by the identification sensor 240. For example, the processing unit 210 may receive the identification information gathered by the identification sensor 240 and compare the identification information to find the VIN of the vehicle 102. Outside data sources may also be provided to identify the vehicle 102. The processing unit 210 then stores the VIN with other collected information, such as the dynamic response information discussed below, in data storage 220. As also discussed below, the system 100, via the communication interface 230, may provide the vehicle information to, for example, the central command 280 for further evaluation, aggregation and uses. The various types of identification sensor 240 will now be discussed in greater detail.

In one exemplary embodiment, the identification sensor 240 may include a radio-frequency identification (RFID) reader. In this exemplary embodiment, the identifier 108 on the vehicle 102 is an RFID tag that transmits the VIN or other identifier. For example, the RFID tag of the identifier 108 may include an integrated circuit for storing and processing information, modulating and demodulating a radio-frequency (RF) signal, and other specialized functions. The RFID tag of the identifier 108 may further include an antenna for receiving and transmitting the signal. The RFID tag of the identifier 108 may be active or passive. Active RFID tags have a power source and may transmit signals autonomously, while passive RFID tags require an external source to provoke signal transmission. For example, a passive RFID tag of the identifier 108 may be activated or interrogated by the RFID reader of the identification sensor 240 such that the identifier 108 transmits the VIN to the cleat 110.

In another exemplary embodiment, the identification sensor 240 may be a bar code reader. In this embodiment, the identifier 108 on the vehicle 102 may be a bar code associated with the VIN. In general, a barcode is an optical machine-readable representation of data and may include one, two, or three dimensional codes or symbologies. In one exemplary embodiment, the barcode that forms a portion of the identifier 108 affixed to an underside of the vehicle 102. In general, the barcode reader of the identification sensor 240 includes a light source, a lens, and a light sensor translating optical impulses into electrical ones. The barcode reader of the identification sensor 240 may further include decoder circuitry analyzing the barcode data. As such, the barcode reader of the identification sensor 240 reads the barcode of the identifier 108 to determine the VIN.

In a further exemplary embodiment, the identification sensor 240 may include a microphone for receiving an acoustic signature or fingerprint broadcast from the identifier 108. In this embodiment, the identifier 108 may be an acoustic signal that contains the identification information, and the identification sensor 204 may be able to receive the signal and extract and identify the information. In one embodiment, the identifier 108 of the vehicle 102 may broadcast a dedicated acoustic signature. In other embodiments, the identifier 108 may actually correspond to the noise generated by the vehicle itself, for example, by the power train or drive train of the vehicle 102.

In another exemplary embodiment, the identification sensor 240 may include a laser interrogator, and the identifier 108 on the vehicle 102 may include, for example, a modulated optical corner cube. In general, an optical corner cube is a retroreflector having of three mutually perpendicular, intersecting flat surfaces, typically three mirrors or reflective prisms that reflect incident light beams back towards the source. As such, the laser interrogator of the identification sensor 240 may produce a laser, and upon the laser striking the corner cube of the identifier 108, receives a return laser signal. The laser interrogator of the identification sensor 240 may provide the laser at visible or non-visible wavelengths. In one exemplary embodiment, the corner cube of the identification sensor 240 may be rotated, sinusoidally oscillated, or otherwise modulated such that the returned laser signal has a modulation corresponding to the VIN. Accordingly, the laser interrogator of the identification sensor 240 and the corner cube of the identifier 108 may cooperate such that the system 100 identifies the vehicle 102.

In this exemplary embodiment, the system 100 may additionally function as a "friend-or-foe" determination technique. For example, as discussed above, the modulation of the corner cube uniquely represents the VIN of the vehicle 102. When the laser of the identification sensor 240 interrogates the corner cube, the return registers as a particular vehicle and can be compared to an onboard data respository to determine whether that vehicle belongs to a certain entity. For this purpose, belonging to a certain entity is defined as a "friendly" vehicle and entitled to certain considerations not given to non-entity vehicles. Likewise, if there is no return, then the vehicle is determined not to be part of the entity. An exemplary case might be a mix of vehicles, some of which are friendly and some of which are not friendly. Given an a priori registry of friendly vehicle modulated optical signature, no optical signature, or an optical signature not in the friendly data repository would determine the vehicle to be "foe." In this manner, friendly vehicles may be selected from among a mix of friendly and foe.

In a further exemplary embodiment, the identification sensor 240 may include an image-capture device, and the identifier 108 on the vehicle 102 may include any unique identifying feature of the vehicle 102, such as a YIN inscription or license plate. In general, the image capture device may be camera, such as a digital camera configured to capture color and/or black-and-white images. Based on these images, the system 100 may identify the vehicle 102, for example, using image recognition software stored as the machine language instructions 222 in data storage 220.

In further embodiments, the system 100 may also be able to identify the vehicle 102 in a manner that does not require a separate identification sensor 240. For example, the vehicle 102 may have a telematics hub or other communication device that directly communicates with the cleat 110 via the communication interface 230. In this way, the vehicle 102 may provide the VIN to the cleat 110 when the vehicle 102 is in the vicinity or rolling over the cleat 110. In a further embodiment, the system 100 may be able to identify the vehicle 102 based on a unique structural response of the vehicle 102 to the physical stimulus of the cleat 110. This response is detected by the response sensor 250 and compared with a database of responses to identify the vehicle 102. The response sensor 250 may also detects faults within the vehicle 102, as discussed in greater detail below.

As referenced above, the external body 112 (FIG. 1) of the cleat 110 acts as a forcing function to stimulate a dynamic response from the vehicle 102 as the vehicle 102 traverses the cleat 110. The dynamic response may include various loads, disturbances, forces, and the like that are imparted by the cleat 110 onto the vehicle 102. The response sensor 250 measures this dynamic response and compares it to baseline responses from corresponding "healthy" vehicles. The response sensor 250 may measure dynamic responses while the vehicle 102 is excited by the cleat 110 as well as when the vehicle 102 is recovering from the stimulus. Based on the comparison of the dynamic response and baseline responses, faults within the vehicle 102 may be identified and the health of the vehicle 102 may be evaluated. The types of faults that may be evaluated particularly include faults associated with the wheel ends and suspension, as well as other problems such as cracked or bent subframes, defective motor mounts, or other issues.

The VIN determined by the identification sensor 240 may enhance the health evaluation of the dynamic response. For example, the VIN may enable the processing unit 210 to choose a specific dataset or model of responses based on the type of vehicle. Moreover, the processing unit 210 may compare the dynamic response of the vehicle 102 to previous dynamic responses of the vehicle 102. In further embodiments, the measurements associated with the dynamic response may be used to update the models for evaluation of future responses.

The response sensor 250 may be a single sensor or a suite of sensors configured to measure the dynamic response and other characteristics of the vehicle 102. For example, the response sensor 250 may include accelerometers, velocity sensors, temperature sensors, strain gauges, force transducers, magnetic pick-ups, and the like operating in any suitable manner. Other sensors that may form part of the response sensor 250 or that augment other functions of the system 100 include, but are not limited to, tactile sensors (e.g., tactors), audio sensors (e.g., microphones) meteorological sensors (e.g., air temperature, humidity, wind speed, barometers), chemical, biological, radiation and nuclear (CBRN) related sensors, material scanning components (e.g., X-ray devices or similar scanners), and sensors for specific purposes (e.g., sensors to detect fuel leaks or explosives). Sensors may be provided to evaluate vehicle weight and balance. Multiple sensors of the same time may be distributed within the cleat 110 or system 100 to measure the dynamic response at different times. Although not necessarily, the response sensor 250 or other components of the system 100 may interact with other health monitoring systems on-board the vehicle to augment the evaluation.

Although not shown, alternate embodiments of the system 100 may further include a user interface with an input unit and/or an output unit. The input unit may receive user input from a user of the system 100 and include a keyboard, a keypad, a touch screen, a computer mouse, a track ball, a joystick, and/or other similar devices capable of receiving user input from a user. The output unit may provide output to a user of the system 100. The output unit may include a visible output device, such as one or more cathode ray tubes (CRT), liquid crystal displays (LCD), light emitting diodes (LEDs), displays using digital light processing (DLP) technology, printers, and/or other similar devices capable of displaying or providing information to a user. The output unit may alternately or additionally include audio output devices.

The system 100 may also include a location device that provides information about the current position of the cleat 110. The location device may include, but is not limited to, Global Positioning System (GPS), gyroscopes, dead reckoning techniques, magnetic devices such as compasses, landmark comparison processes, lasers (including range finders and ring gyroscopes), and/or radio-frequency waves.

The information gathered by the cleat 110 may have a number of uses and applications. For example, the VIN and health information for the vehicle 102 may be gathered by the control entity 280 from the cleat 110 via the network 270. The network 270 may be, for example, a wireless-communication network that uses an air interface, such as a ZigBee, Wi-Fi, and/or WiMAX interface to a data network, such as a WAN, a LAN, one or more public data networks (e.g., the Internet), one or more private data networks, or any combination of public and private data networks. Moreover, the network 270 may enable secure communications, perhaps by the use of communication-security techniques such as, but not limited to, Secure Sockets Layer (SSL), Transport Layer Security (TLS), Secure Shell (SSH), Virtual Private Network (VPN), IP Security (IPSec), Trusted Computer System Evaluation Criteria (TCSEC)/Orange Book techniques, ISO/IEC 15443, 15408 and/or 17799 techniques, public/private key techniques such as the RSA algorithm, and/or other cryptographic algorithms.

The control entity 280 gathers the VIN and health information from the cleat 110 into a vehicle record. The vehicle record may include current health information from the cleat 110, as well as past gathered health information from the cleat 110 and other cleats. The vehicle record may additionally include repair information, mileage, and time in service. Other information may include vehicle characteristics, such as dimensions, towing capacity, cargo type, and required driver qualifications. Based on this information, the control entity 280 may determine historical health trends of the vehicle 102 and generate health prognoses, from which estimates about remaining useful life and mission suitability may be derived. Over time, the VIN and health information gathered by multiple cleats 110 enables the control entity 210 to track the position, engine usage, time and miles driven, and other characteristics of the vehicle 102, such as configuration changes to cargo, trailers, and passengers.

In a further exemplary embodiment, the control entity 280 may use aggregate VIN and health information gathered by the cleat 110 to select groups of vehicles for a mission. For example, a group of vehicles may be organized into a convoy for transporting cargo along a roadway from a source location to a destination location. The vehicles for the convoy may be selected based on a number of different variables, such as requirements about the cargo to be transported, the availability of vehicles used to transport the cargo, the availability of drivers to operating the vehicles in the convoy, the choices of routes between the source and destination, and conditions likely to be encountered en route. For example, the vehicles of the convoy may be selected based on the road or terrain conditions or grades. In particular, the vehicles may be selected based on health characteristics. In particular, using the offboard cleat 110 allows the control entity 280 to determine remaining useful life (RUL) of a number of vehicles 102. As such, the control entity 280 can select vehicles by VIN that have RUL compatible with a particular mission.

Generally, the convoy vehicles are selected from an available vehicle database that may be supplemented by the health information gathered from the cleats 110. Certain missions or convoys may call for environment-specific equipment, such as, but not limited to, arctic-specific or desert-specific equipment, more durable tires, suspension, and other equipment for traversing temporary roads, armor and ordnance for military vehicles, and cargo-specific equipment for carrying specific types of cargo, such as, but not limited to, refrigeration units, tanker containers, and flat-bed trailers. Other considerations include tonnage capacity, tonnage to haul, estimated fuel usage, estimated time of arrival (ETA), estimated mileage, and start time. Accordingly, the heath information associated with a particular vehicle 102 enables an enhanced convoy selection. The convoy selection may be based on user selection, or alternatively, the convoy selection automatically or algorithmically determined based on the variables and information discussed above, including the health information gathered by the cleats 110. Additionally, convoy planning may occur in real-time as the vehicles, such as vehicle 102, change position and interact with a system of cleats 110 in which additional VIN and health information are gathered.

In accordance with another exemplary embodiment, the cleats 110 and/or system 100 may also form part a larger system for controlling errant vehicles. Generally, errant vehicles are vehicles that travel in an unsafe direction and pose a hazard, such as against the prevailing flow of traffic or unauthorized access into secure areas In particular, the system 100 determines the VIN of the vehicle 102, as discussed above, as well as other vehicle characteristics, such as velocity and direction from sensors that are included in the response sensor 250. The velocity, direction, and identity of the vehicle 102 may be compared to authorized velocities, directions, and vehicles associated with the roadway. As such, the system 100 may determine whether or not the vehicle 102 is errant, and if so, whether or not the vehicle 102 is authorized to be errant.

Information about the errant vehicle 102 may be provided to the control entity 280 via the network 270. In response, the control entity 280 may initiate countermeasures, including physical countermeasures, informational countermeasures, and/or electronic countermeasures. Physical countermeasures may include barriers, walls, and other physical devices that act to change the velocity (direction and/or speed) of the errant vehicle. The informational countermeasures may include security warnings, sirens, lights, signs and/or other indications that the vehicle is traveling against the prevailing flow of traffic or within a secured area. Electronic countermeasures may include vehicle-countermeasure commands that instruct, for example, the electronic control unit (ECU) of the errant vehicle to stop, slow, change a vehicle-control parameter, such as the fuel-flow of the vehicle, and/or change the direction of the errant vehicle.

FIGS. 3-12 demonstrate exemplary response collection and analysis of dynamic responses of the vehicles (e.g., vehicle 102) evaluated by the system 100. As noted above, the identification of the vehicle 102 may enhance the selection and development of the models and/or baseline datasets for analyzing the dynamic responses. In general, the collection and analysis of response data discussed herein are disclosed by way of example only, and any suitable mechanism may be provided for monitoring the health of the vehicle with respect to the dynamic response as well as the identification of the vehicle. For example, some exemplary techniques for health monitoring with a cleat may be disclosed in International Application No. PCT-US09-57919, entitled "METHODS AND APPARATUS FOR DIAGNOSING FAULTS OF A VEHICLE" filed Sep. 22, 2009 and U.S. Patent Application No. 61/098,995, entitled "INSTRUMENTED CLEAT" filed Sep. 22, 2008. These three applications represent a joint collaboration between Purdue University and Honeywell International and are hereby incorporated by reference in their entirety.

Figure 3:
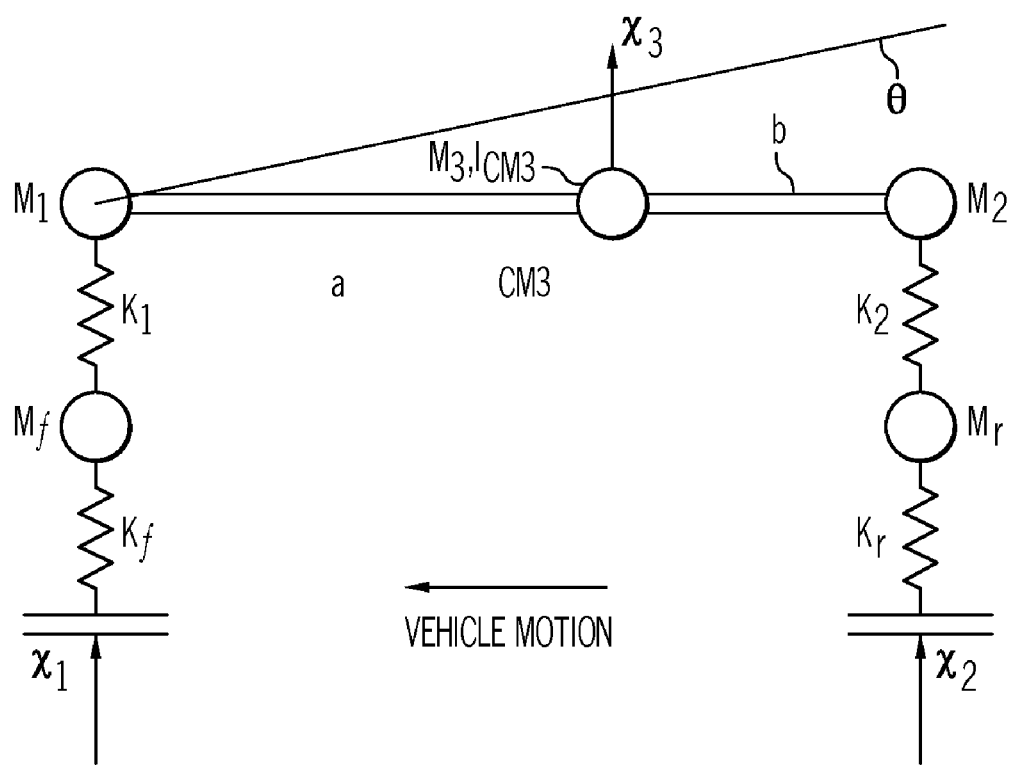
FIG. 3 shows a simplified four degree of freedom model for a vehicle in an exemplary system of FIG. 2.

As such, FIG. 3 shows a simplified four degree of freedom model for a vehicle (e.g., vehicle 102) in an exemplary system of FIG. 2. In one example discussed below, the tested vehicle 102 has a length of 4.6 m, width of 2.1 m, height of 1.8 m, and mass of 2340 kg. These may be known by the system 100 based on identification of the vehicle 102 and/or be measured by the cleat 110. In general, the frame of the vehicle 102 may be modeled as a rigid body with three lumped masses, Mj with j=1, 2, and 3, representing the front, rear, and center of mass payloads carried by the vehicle 102. The mass moment of inertia about the center of mass may be represented as Icm³, and dimensions a and b may reference the location of the center of mass. The tire stiffness properties are denoted by Kf and Kr for the front and rear wheels, respectively. K1 and K2 denote the front and rear suspension rate properties, respectively. In one exemplary embodiment, proportional viscous damping is assumed in the model. Again, these values may be known by the system 100 based on identification of the vehicle 102 and/or be measured by the cleat 110.

The vertical base motions of the front and rear tires may be denoted by x1 and x2. The vertical and pitch motions of M3 and Icm³ are denoted by x3 and q, respectively. Exemplary nominal parameter values that were used in this exemplary discussion are listed in Table 1.

TABLE 1

| Parameter | Value |
| --- | --- |
| $M_1, M_2, M_3$ | 950, 80, 1000 kg |
| $M_f, M_r$ | 100, 100 kg |
| $I_{cm3}$ | 10 kg m² |
| a, b | 110, 5 ft |
| $K_1, K_2$ | 50000, 40000 N/m |
| $K_f, K_r$ | 500000, 400000 N/m |

The lumped parameter set of differential equations corresponding to this discussion may be derived using Newton-Euler methods, such as provided below in Equation (1).

$$\begin{bmatrix} M_1+M_2+M_3 & 0 & 0 & 0 \\ 0 & I_{cm3} & 0 & 0 \\ 0 & 0 & M_f & 0 \\ 0 & 0 & 0 & M_r \end{bmatrix} \begin{Bmatrix} \ddot{x}_3 \\ \ddot{\theta} \\ \ddot{x}_f \\ \ddot{x}_r \end{Bmatrix} + \quad (1)$$

$$\begin{bmatrix} K_1+K_2 & * & * & * \\ -K_1(a+c)+ & -K_1(a+c)+ & & \\ K_2(b-c) & K_2(b-c) & * & * \\ -K_1 & K_1(a+c) & K_f+K_1 & * \\ -K_2 & -K_2(b-c) & 0 & K_r+K_2 \end{bmatrix} \begin{Bmatrix} x_3 \\ \theta \\ x_f \\ x_r \end{Bmatrix} =$$

$$\begin{Bmatrix} 0 \\ 0 \\ K_f x_1 \\ K_r x_2 \end{Bmatrix}$$

In Equation (1), c=(b M2−a M1)/(M1+M2+M3) and an "*" in the stiffness matrix indicates a symmetric entry in the matrix with respect to the diagonal. A viscous proportional damping model of the form shown below in Equation (2) may also be used in Equation (1) to describe the dissipative (nonconservative) effects.

$$[C]=\alpha[M]+\beta[K], \alpha=0, \beta=0.02 \quad (2)$$

The functions x1 and x2 may be used to model the profile of the cleat, which provides a base excitation to each wheel at different times. The variables x1 and x2 may be expressed using a Hanning function of the form of Equation (3) below.

$$x_1(t) = \begin{cases} \frac{h}{2}\left(1-\cos\frac{2\pi t}{T_c}\right) & \text{for } t \leq T_c \\ 0 & \text{for } t > T_c \end{cases} \quad (3)$$

$$x_2(t) = x_1(t-T_b)$$

In Equation (3), h is the height of the cleat 110, Tc is the time during which a wheel is in contact with the cleat 110, and Tb is the time it takes for the rear wheel to come into contact with the cleat 110 after the front wheel has reached the cleat 110. Tc may be calculated using the length of the cleat L and the speed of the vehicle v, e.g., Tc=L/v. Likewise, Tb can be calculated using the distance from wheel to wheel (wheelbase) w and the speed, e.g., Tb=w/v. The exemplary values for x1 and x2 are plotted in FIG. 4, and in this example, correspond to a 15 ft wheelbase, 12 in wide cleat 110, and a vehicle speed of 5.8 mph. In general, part of the instrumented cleat design may be associated with the frequency range over which the cleats 110 excite the vehicle 102. Therefore, the frequency spectra of these base excitation time histories are also plotted in FIG. 5. In one exemplary embodiment, both inputs produce the same spectral features because they are identical in amplitude but different in phase. In this example, the bandwidth of these excitations is 94 rad/s.

The input-output model in Equation (1) may then rewritten in state variable form in preparation for conducting time domain simulations. The state vector in this state space representation of the model may include the response vector from Equation (1) and its derivative to result in the state variable model is given by Equation (4).

$$\frac{d}{dt}\begin{Bmatrix}\{x\}\\\{\dot{x}\}\end{Bmatrix} = \begin{bmatrix}[0]_{4\times 4} & [I]_{4\times 4}\\-[M]^{-1}[K] & -[M]^{-1}[C]\end{bmatrix}\begin{Bmatrix}\{x\}\\\{\dot{x}\}\end{Bmatrix} + \qquad(4)$$

$$\begin{bmatrix}[0]_{6\times 2} & [0]_{6\times 2}\\\begin{bmatrix}M_f & 0\\0 & M_r\end{bmatrix}^{-1}\begin{bmatrix}K_f & 0\\0 & K_r\end{bmatrix} & \begin{bmatrix}M_f & 0\\0 & M_r\end{bmatrix}^{-1}\begin{bmatrix}\beta K_f & 0\\0 & \beta K_r\end{bmatrix}\end{bmatrix}\begin{Bmatrix}x_1(t)\\x_2(t)\\\dot{x}_1(t)\\\dot{x}_2(t)\end{Bmatrix}$$

The desired outputs of this model are the forces inside the front and rear tires because the instrumented cleat 110 measures forces in the tire to identify faults in the tires and suspension. Therefore, the output equation used in this state variable model is given by Equation (5) below.

$$\begin{Bmatrix}f_1\\f_2\end{Bmatrix} = \begin{bmatrix}0 & 0 & -K_f & 0 & 0 & 0 & 0 & 0\\0 & 0 & 0 & -K_r & 0 & 0 & 0 & 0\end{bmatrix} \qquad(5)$$

$$\begin{Bmatrix}\{x\}\\\{\dot{x}\}\end{Bmatrix} + \begin{bmatrix}K_f & 0 & \beta K_f & 0\\0 & K_r & 0 & \beta K_r\end{bmatrix}\begin{Bmatrix}x_1(t)\\x_2(t)\\\dot{x}_1(t)\\\dot{x}_2(t)\end{Bmatrix}$$

The modal properties associated with the free response of the vehicle model were calculated by solving the corresponding eigenvalue problem using the state matrix in Equation (4). The eigenvalue formulation takes the following form as shown in Equation (6) below.

$$\begin{bmatrix}[0]_{4\times 4} & [I]_{4\times 4}\\-[M]^{-1}[K] & -[M]^{-1}[C]\end{bmatrix}\begin{Bmatrix}\{x\}\\\{\dot{x}\}\end{Bmatrix} = \lambda\begin{Bmatrix}\{x\}\\\{\dot{x}\}\end{Bmatrix} \qquad(6)$$

Figure 5:
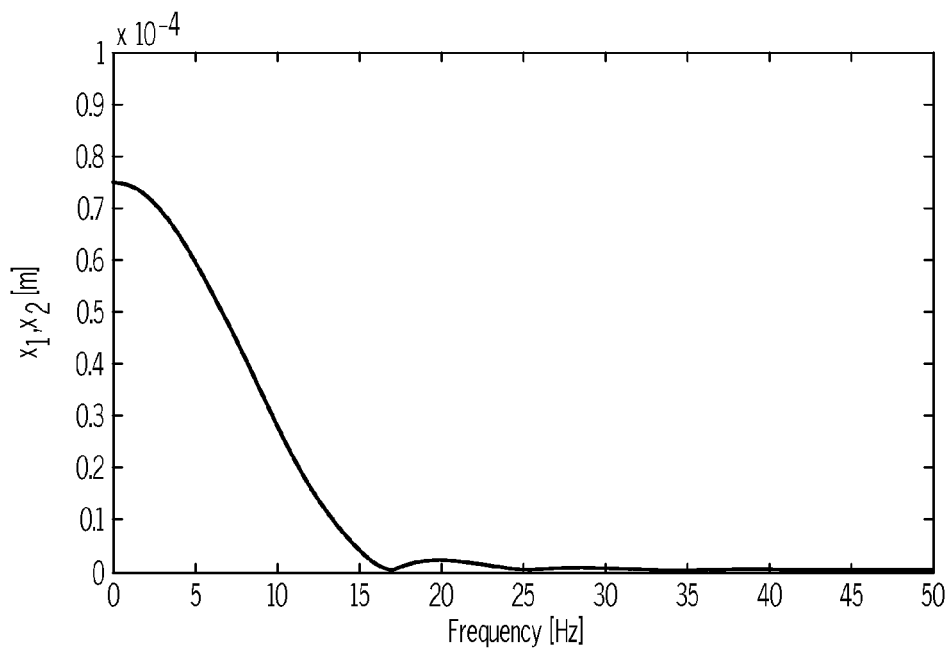
FIG. 5 is a graphical representation of cleat inputs ($X1(f)$ and $X2(f)$) acting on front and rear tires in an exemplary system of FIG. 2.

Symbol $\{x\}$ represents the modal deflection shape and $\lambda$ is the corresponding modal frequency (eigenvalue). For the mechanical properties chosen in Table 1, the eigenvalue problem in Equation (6) may be solved and the exemplary modal properties obtained may be listed in Table 2 below. In this example, the first two modes of vibration are associated with the sprung mass (pitch and bounce) and the second two modes are associated with the wheel hop resonances of the front and rear. The modal deflection shapes are only indicated to two significant digits to highlight the dominant degrees of freedom in each mode shape. The four undamped natural frequencies are at 0.63, 0.88, 7.90, and 7.92 Hz. Consequently, when the base excitation functions shown in FIG. 5 are applied to the vehicle 102 moving at 5.8 mph, all four modes of vibration will be excited because the bandwidth of the primary lobes in each of the input frequency spectra spans the frequency range from 0 to 15 Hz (94 rad/s).

TABLE 2

| Undamped Freq. (rad/s) and Damping Ratio | Modal Vector |
| --- | --- |
| 4.0, 0.04 | $[0.87\ 1.00\ -0.14\ -0.27]^1$ |
| 5.5, 0.06 | $[1.00\ -0.09\ 0.11\ 0.07]^1$ |
| 49.6, 0.89 | $[-0.00\ -0.00\ -0.00\ 1.00]^1$ |
| 49.7, 1.11 | $[-0.00\ 0.00\ 1.00\ 0.00]^1$ |

To examine the forces that are produced in the tires of the vehicle 102 as the front and rear wheels traverse the cleat 110, the Bode diagrams relating the input displacements to the wheels (x1 and x2) and the forces in the tires (f1 and f2), e.g., as in Equation (5), may be constructed. These diagrams relate the amplitudes and phases of the input displacements to the amplitudes and phases of the forces measured within the instrumented cleat 110, which may be used to diagnosing vehicle faults. FIGS. 6A and 6B show the Bode diagrams for the four frequency response functions relating the tire input displacements to the tire output forces.

The modal frequencies provided above for the sprung vehicle mass are demonstrated by the peaks of the Bode magnitude plots. The two wheel hop frequencies are also evident but are much more heavily damped than the bounce and pitch modes as expected from Table 2.

Figure 7A:
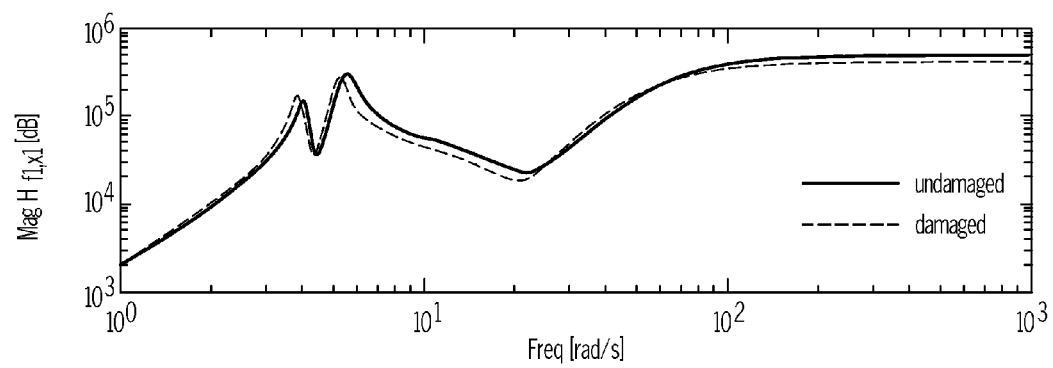
FIG. 7 is a graphical representation of a Bode diagram for inputs at front wheel for undamaged and damaged cases showing frequency ranges sensitive to damage in an exemplary system of FIG. 2.
Figure 7B:
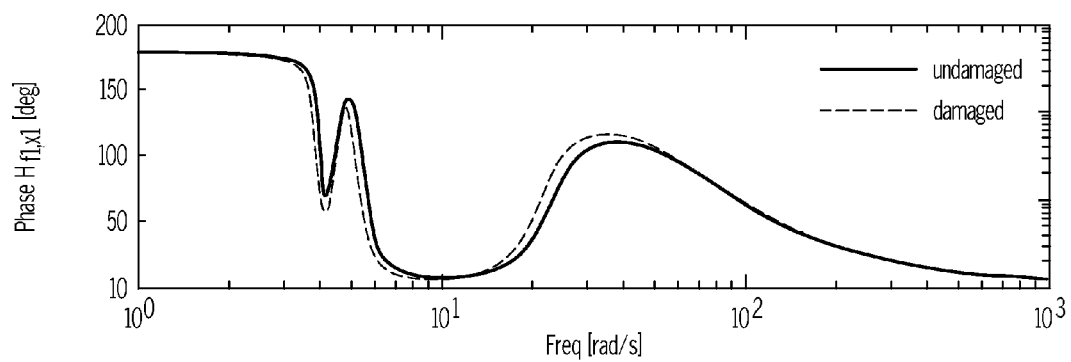

Damage due to fractured suspension tie bolts or faulty struts and tires that are underinflated or contain separated plies were analyzed. First, a 15% reduction in K1 may be used to model damage in the front suspension. FIG. 7 shows the resulting Bode diagram relating the input displacement at the front wheel to the force in the front tire in the undamaged and damaged states. The frequency range sensitive to this damage is the mid-frequency range in the vicinity of the resonances of the sprung mass.

This result is consistent with the location of the damage in the system relative to the deflection mode shapes listed in Table 2. The bounce motion at 4 rad/s (and to a lesser extent in the pitch motion at 5 rad/s) indicates that there is more deflection and velocity across the suspension than in the tire hop deflections. Therefore, these motions of the sprung mass may be sensitive to the suspension damage in K1. In contrast, the response in the frequency range above 40 rad/s is most sensitive to changes in the front tire rate, Kf.

Figure 4:
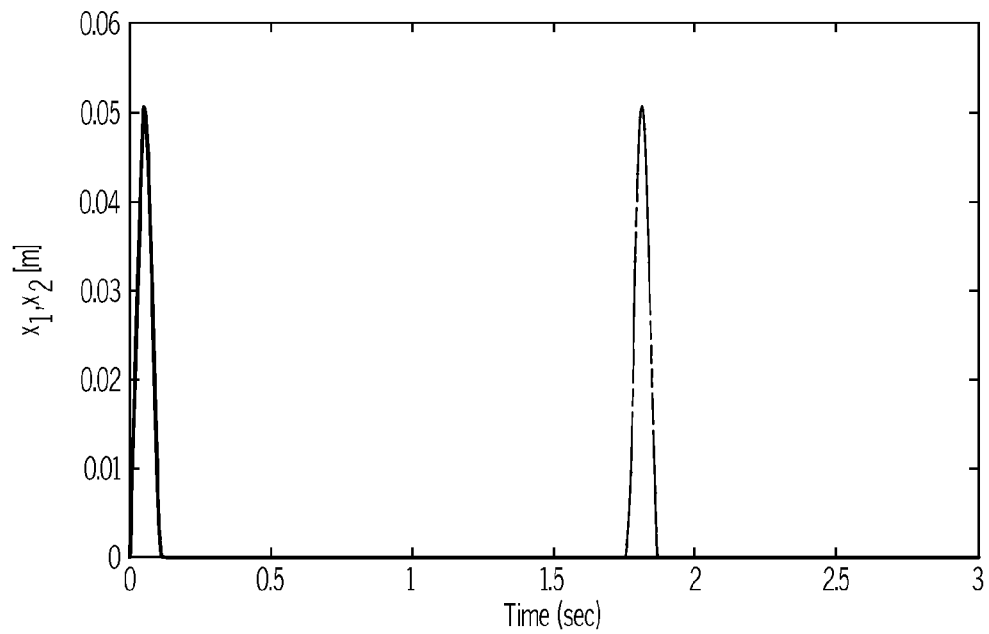
FIG. 4 is a graphical representation of one or more cleat inputs (t1 and t2) acting on front and rear tires in an exemplary system of FIG. 2.
Figure 8A:
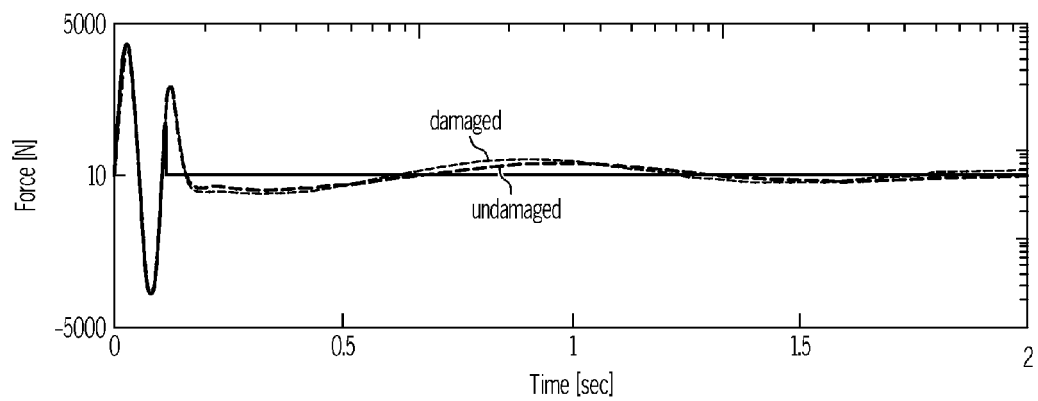
FIG. 8A is a graphical representation of forced response in the time domain with and without a fault introduced in the front suspension using the complete and partial force time histories in an exemplary system of FIG. 2.
Figure 8B:
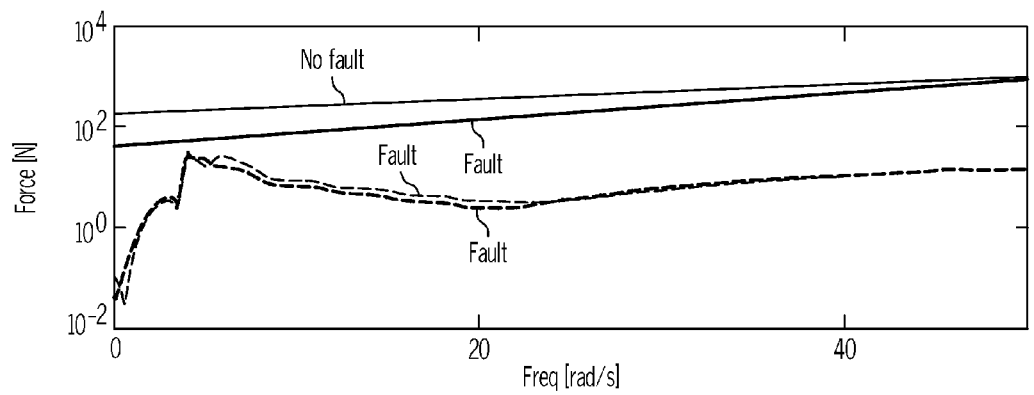
FIG. 8B is a graphical representation of forced response in the frequency domain with and without a fault introduced in the front suspension using the complete and partial force time histories in an exemplary system of FIG. 2.

The forced response in the time and frequency domains for the excitation functions shown in FIG. 4 may then be calculated, and FIGS. 8A and B illustrate the time and frequency domain forces in the front tires for the fault scenario involving a 15% reduction in the front suspension system. In FIGS. 8A and B, two sets of forces in the time and frequency domains in the tire are plotted. The solid lines correspond to tire forces in undamaged and damaged vehicles assume that the force is measured while the tire is traversing the cleat 110. The dotted lines correspond to the same scenario assuming the force is measured throughout the time period shown. In this example, there are subtle changes in the time history due to a fault and more pronounced changes in the frequency spectrum. The changes in the spectrum occur in the frequency range dominated by the pitch and bounce degrees of freedom due to the sensitivity of the force in the tire to faults in the vehicle (e.g., see FIG. 7).

Figure 9:
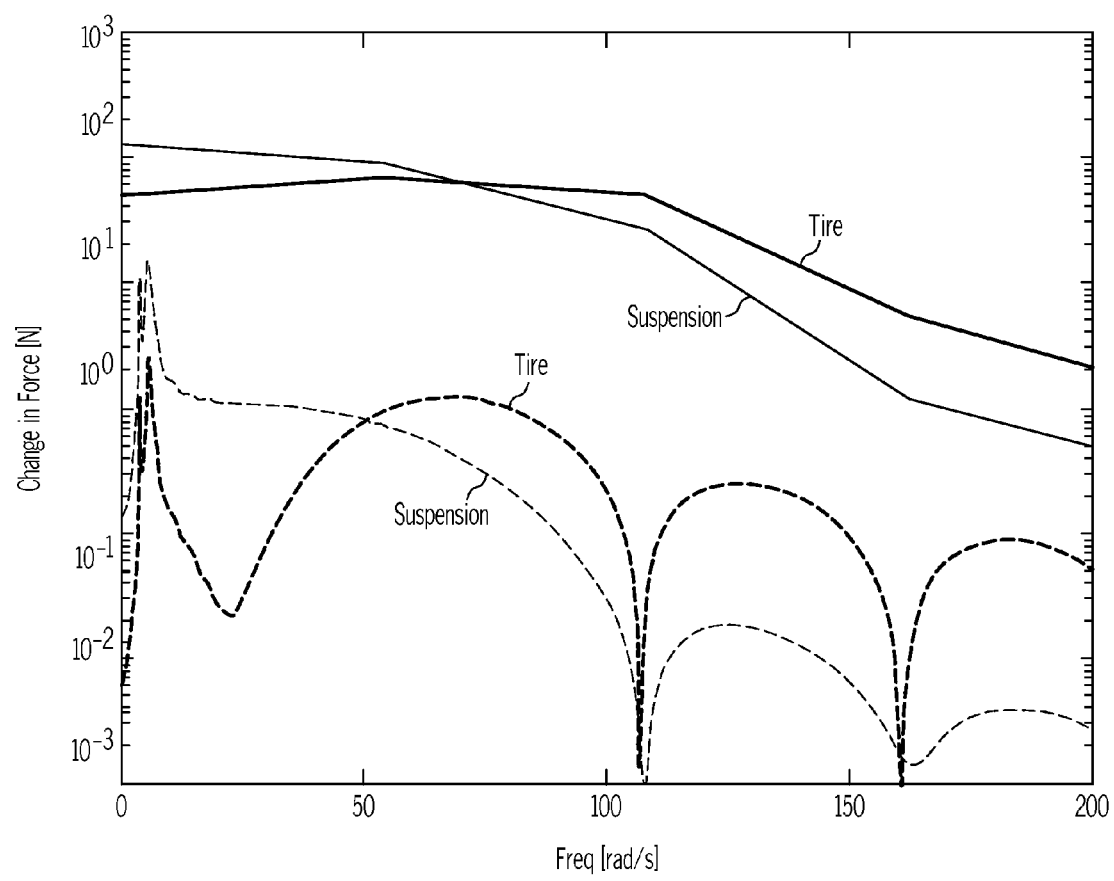
FIG. 9 is a graphical representation of the magnitude of change in force for a suspension and tire fault using the complete and partial force time histories in an exemplary system of FIG. 2.

A similar forced response example was performed for a scenario involving a 15% reduction in the front tire stiffness. Then, the resulting forced response for this fault and the forced response for the suspension fault were both subtracted from the undamaged forced response. The spectral magnitudes of these differences due to the two distinct faults were plotted as shown in FIG. 9 out to 200 rad/s. The suspension fault exhibits larger changes in the low frequency range whereas the tire fault exhibits larger changes in the high frequency range. When the entire force time history is measured throughout the vehicle motion, the differences due to faults are more apparent. However, the differences are also apparent in the case when only the short segment of force data is available as the tires traverse the cleat 110.

In another example, six scenarios were analyzed to provide: a first baseline, a simulated suspension fault, three simulated tire faults, and a second baseline. The baseline vehicle had no faults and the pressure in all four tires was 35 psi. Another vehicle had a fault in a front right coil spring of the suspension, and three vehicles had a fault corresponding to reduced tire pressure of the front right tire to 30 psi, 25 psi, and 20 psi.

Figure 10A:
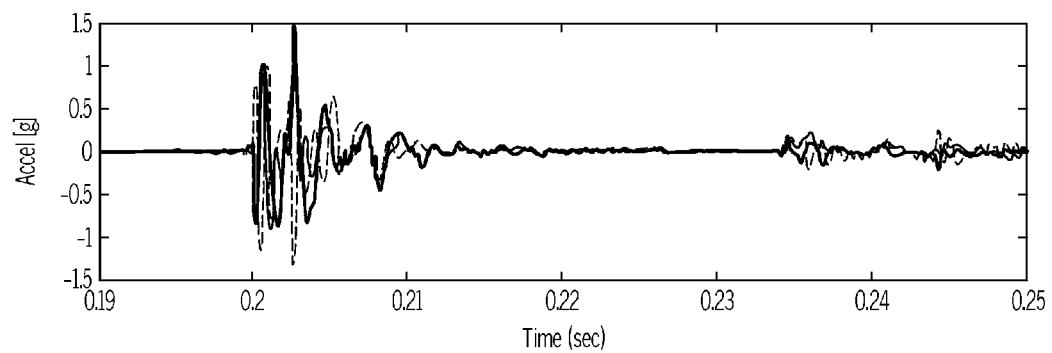
FIG. 10A is a graphical representation of acceleration responses on a right side of an exemplary vehicle with vertical, lateral, and tracking directional responses in an exemplary system of FIG. 2.
Figure 10B:
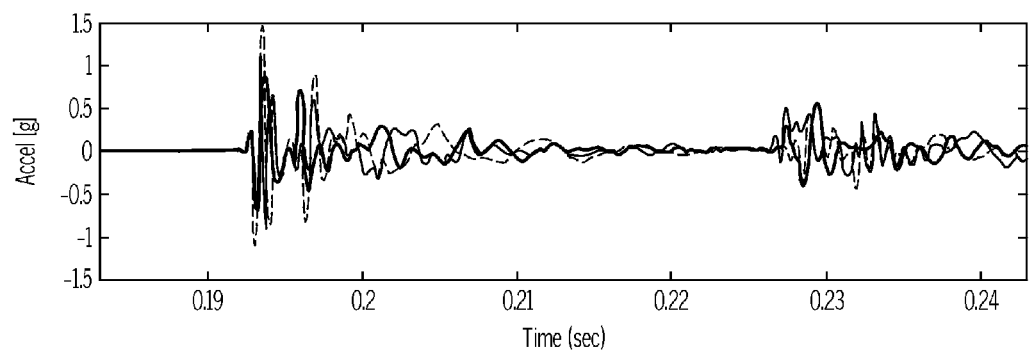
FIG. 10B is a graphical representation of acceleration responses on a left side of an exemplary vehicle with vertical, lateral, and tracking directional responses in an exemplary system of FIG. 2.

The scenarios include the vehicles being driven over the instrumented cleat at 5 mph five times and the average accelerations were calculated from the measured data. The data was initially sampled at 16,384 Hz and then down sampled to 819.2 Hz to highlight the lower frequency content that may be more indicative of the wheel end and suspension response. FIGS. 10A and 10B show the right and left cleat responses in the vertical, lateral, and tracking directions for the first baseline measurement as the front tire traversed the cleat. The time histories observed when the back wheels traversed the cleat were similar. Note that the left cleat measurement was slightly delayed by 70 msec relative to the right cleat measurement. The reason for this delay is that the two tires strike the cleat at slightly different times. The response amplitudes in the three directions were different with a peak acceleration of 1.5 g.

Figure 11A:
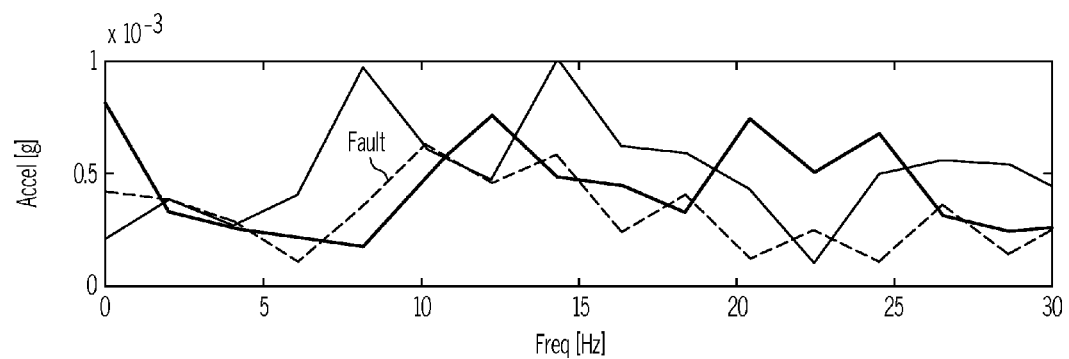
FIG. 11A is a graphical representation of front vertical acceleration responses on a right side of an exemplary vehicle of an exemplary system of FIG. 2.
Figure 11B:
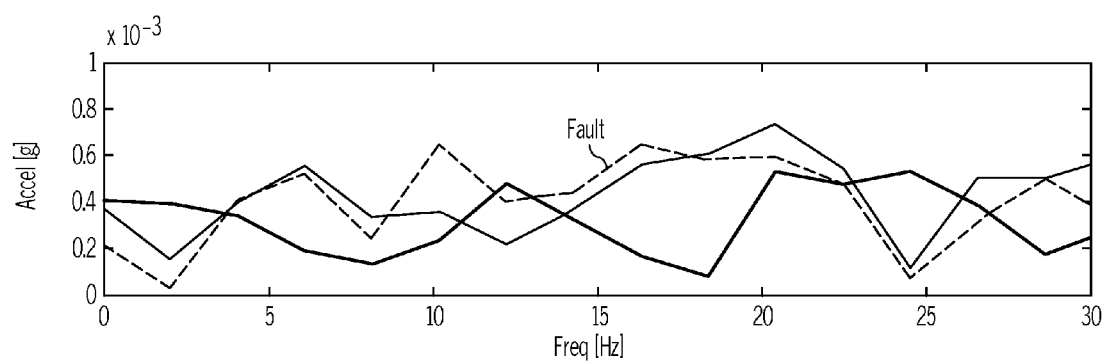
FIG. 11B is a graphical representation of front vertical acceleration responses on a left side of an exemplary vehicle of an exemplary system of FIG. 2.

First, for the suspension fault vehicle, FIGS. 11A and 11B show the vertical acceleration spectra for the right and left wheels. These plots correspond to the data acquired as the front wheels traversed the cleat 110. The solid dark and dotted dark lines correspond to the two baseline datasets. The lighter solid line corresponds to the suspension fault dataset. Note that on the top plot for the right wheel in FIG. 11A, the suspension fault data exhibits two strong peaks at 7.5 and 15 Hz, respectively.

Figure 12:
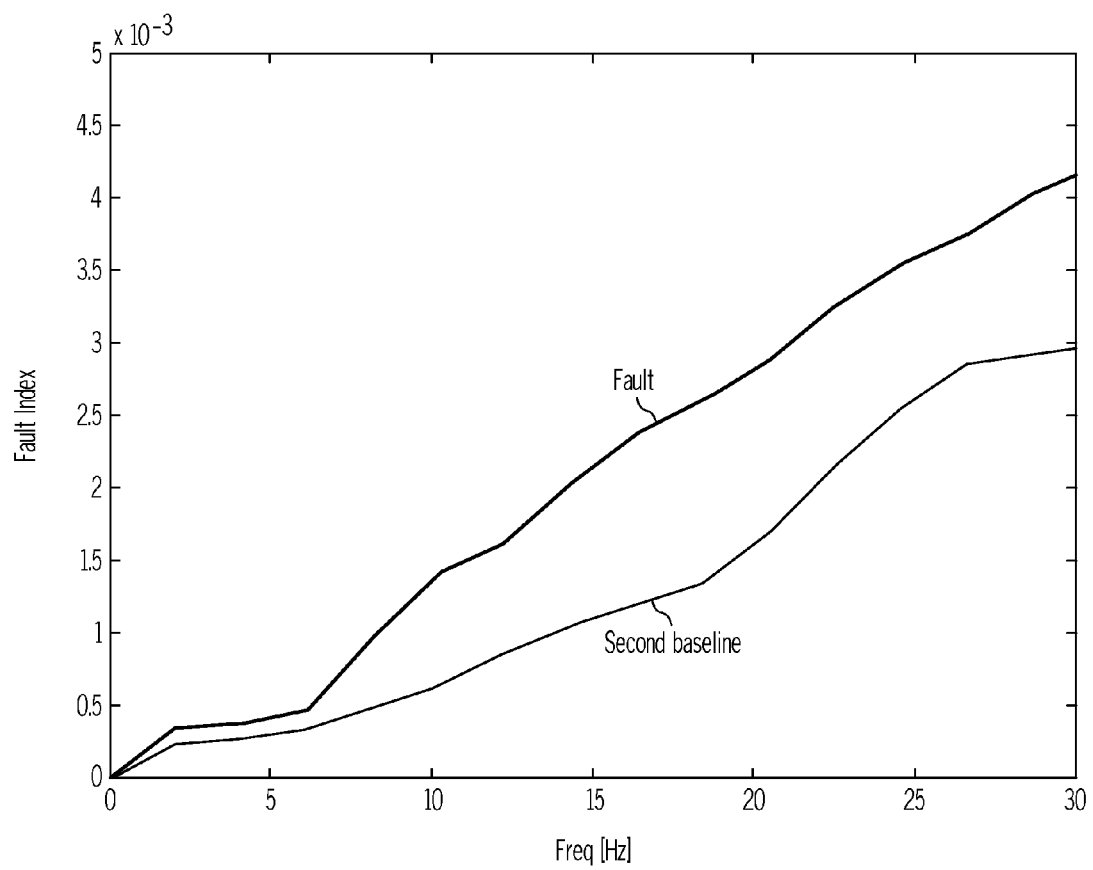
FIG. 12 is a graphical representation of a comparison of a fault index for a baseline dataset and a faulty dataset of an exemplary system of FIG. 2.

The peak at 7.5 Hz is associated with one of the suspension modes probably at 10 Hz in the other two datasets. The modal peak of the suspension fault vehicle is lower in frequency because, for example, the suspension fault results in a lower effective stiffness. FIG. 12 is a graph indicating the exemplary difference between the second baseline dataset and the first baseline dataset and the difference between the faulty dataset and the first baseline dataset calculated as a function of frequency. Then, the area underneath these two functions were calculated and plotted as a function of frequency, which represents the fault index of FIG. 12. Note that the faulty dataset exhibits a larger difference from the first baseline dataset than the second baseline dataset. An appropriate threshold may be chosen in order to detect the suspension fault using this result.

The fault index may be a quantitative measure of the difference between baseline data and data from a specific vehicle under analysis. Baseline data can include response data from the specific vehicle under test, but taken at a time when the vehicle is considered to be an unfaulted configuration, such as when the vehicle left its new build assembly line, when it left as a repaired and rebuilt vehicle from a depot, or even at some point in time after usage of the vehicle began, as examples. In some cases the baseline data is a baseline for a family of vehicles, wherein the term "family" includes vehicles of the same name or part number. In other embodiments, the baseline data may be a baseline for an individual vehicle. When the baseline data includes multiple vehicles, or when it includes multiple data sets from a particular vehicle, then the baseline data can be quantified statistically in terms of high and low response at a particular frequency, for a vehicle being driven at a particular velocity. Exemplary embodiments may also provide baseline data that is simplified to a range of responses at a particular vehicle speed. Exemplary embodiments may also provide baseline data that is expressed statistically, such as in terms of mean, median, and standard deviation.

Exemplary embodiments may also provide any manner of fault index in which a dataset from a specific is compared to a baseline dataset. As one example, the baseline dataset and the specific dataset can be analyzed in the frequency domain, such as by means of a transformation of the time-based data with Fourier transformation. As one example, the baseline and specific Fourier components can be compared at any of the known resonant modes of the chassis-suspension system. Further, the fault index can include comparison of frequency components that are not at or near resonant frequencies, such as those that could be induced by a fault in a subframe or frame of the vehicle. Further, the fault index could be prepared in terms of a shift in frequency for a resonant mode.

Yet other embodiments may provide analysis of the fault index in the time domain. As one example, the fault index could be based on a comparison of terms of peak acceleration, peak velocity, peak displacement, peak strain, and the like. Further, the fault index could be based on the comparison of data in the time domain in a particular time window, such as within a window of predetermined time, the window having a beginning based on when the first motion is detected by the sensors within the cleat 110, as one example.

Accordingly, exemplary embodiments discussed herein provide a system 100 that includes one or more cleats 110 that stimulate a dynamic response from a vehicle 102 rolling over the cleat 110. The system 100 measures and evaluates the dynamic response to assess the health of the vehicle 102. Additionally, the system 100 identifies the particular vehicle 102, e.g., according to the VIN of the vehicle 102. Identification and health monitoring of the vehicle 102 enables historical health trending, evaluation of the remaining useful life and mission suitability, and enhanced fleet and convoy management.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A health monitoring system for a vehicle configured to travel on a surface, the vehicle having an identity, the system comprising:
 a body positioned on the surface and configured to stimulate a dynamic response from the vehicle as the vehicle travels over the body;
 a response sensor associated with the body and configured to measure the dynamic response from the vehicle; and
 an identification sensor associated with the body and configured to collect data corresponding to the identity of the vehicle;
 a processing unit associated with the response sensor and the identification sensor; and
 data storage coupled to the processing unit, wherein the processing unit is configured to receive the dynamic response from the response sensor and to evaluate the health of the vehicle based on the dynamic response.

2. The health monitoring system of claim 1, wherein the body is a cleat that produces a localized elevation change relative to the surface.

3. The health monitoring system of claim 1, wherein the response sensor and identification sensor are housed within the body.

4. The health monitoring system of claim 1, wherein the data storage includes a plurality of models for evaluating the health of the vehicle, and wherein the processing unit is configured to select and execute one of the models based on the identity of the vehicle.

5. The health monitoring system of claim 1, wherein the processing unit and data storage are housed within the body.

6. The health monitoring system of claim 1, wherein the processing unit is configured to incorporate the dynamic response into a historical trend based on the identity of the vehicle.

7. The health monitoring system of claim 1, wherein the identification sensor includes a radio-frequency identification (RFID) reader configured to receive an RFID signal from the vehicle indicating the identity.

8. The health monitoring system of claim 1, wherein the identification sensor includes a barcode reader configured to read a barcode on the vehicle indicating the identity.

9. The health monitoring system of claim 1, wherein the identification sensor includes a microphone configured to receive an acoustic signature broadcast by the vehicle indicating the identity.

10. The health monitoring system of claim 1, wherein the identification sensor includes a laser interrogator configured to interrogate a modulated corner cube on the vehicle that indicates the identity.

11. The health monitoring system of claim 1, wherein the identification sensor includes an image device configured to capture an image of at least a portion of the vehicle that indicates the identity.

12. A health monitoring system for a vehicle configured to travel on a surface, the vehicle having an identity, the system comprising:
   a body positioned on the surface and configured to stimulate a dynamic response from the vehicle as the vehicle travels over the body;
   a response sensor associated with the body and configured to measure the dynamic response from the vehicle; and
   an identification sensor associated with the body and configured to collect data corresponding to the identity of the vehicle,
   further comprising
   a processing unit coupled to the response sensor and the identification sensor; and
   data storage coupled to the processing unit,
   wherein the processing unit is further configured to receive the data from the identification sensor and to determine the identity of the vehicle based on the data.

13. A method for monitoring the health of and determining the identity of a vehicle configured to travel on a surface, the method comprising the steps of:
   stimulating a dynamic response of the vehicle by positioning a cleat on the surface such that the vehicle rolls over the cleat as the vehicle travels on the surface;
   measuring the dynamic response of the vehicle to the cleat;
   evaluating the health of the vehicle based on the dynamic response;
   collecting identification information from the vehicle; and
   determining the identity of the vehicle from the collected identification information,
   further comprising stimulating a dynamic response of a plurality of vehicles, measuring the dynamic response of the plurality of vehicles, evaluating the health of the plurality of vehicles; collecting identification information from the plurality of vehicles, determining the identity of the plurality of vehicles;
   aggregating the identity and health information from the plurality of vehicles; and
   selecting a group of vehicles from the plurality of vehicles based on the aggregated identity and health information.

14. The method of claim 13, wherein evaluating step includes selecting and executing a health model based on the identity of the vehicle.

15. The method of claim 13, further comprising creating an historical health trend for the vehicle based on the dynamic responses over time.

16. The method of claim 13, wherein the step of collecting identification information includes at least one of interrogating an RFID tag on the vehicle,
   reading a barcode on the vehicle,
   capturing an image of the vehicle;
   receiving an acoustic signature from the vehicle or
   interrogating a modulated optical corner cube on the vehicle.

* * * * *